United States Patent [19]
Koivu

[11] Patent Number: 5,940,412
[45] Date of Patent: Aug. 17, 1999

[54] DECODING METHOD

[75] Inventor: Vesa Koivu, Oulu, Finland

[73] Assignee: Nokia Telecommunications Oy, Espoo, Finland

[21] Appl. No.: 08/716,312

[22] PCT Filed: Mar. 27, 1995

[86] PCT No.: PCT/FI95/00164

§ 371 Date: Sep. 27, 1996

§ 102(e) Date: Sep. 27, 1996

[87] PCT Pub. No.: WO95/26602

PCT Pub. Date: Oct. 5, 1995

[30] Foreign Application Priority Data

Mar. 28, 1994 [FI] Finland ................................ 941437

[51] Int. Cl.[6] ........................................................ G06F 11/10
[52] U.S. Cl. .......................................... 371/5.1; 370/241
[58] Field of Search ................................ 371/5.1, 3, 20.1,
371/67.1, 49.1, 37.7, 20.4, 37.01, 43.5,
43.6, 47.1, 71; 395/182.04, 185.01, 185.05;
379/59, 58, 63, 69; 370/17, 95.3, 241, 242,
252

[56] References Cited

U.S. PATENT DOCUMENTS

| | | | |
|---|---|---|---|
| 4,546,474 | 10/1985 | Sako et al. | 371/39 |
| 5,214,687 | 5/1993 | Kansakoski et al. | 379/60 |
| 5,327,574 | 7/1994 | Monma et al. | 455/33.2 |
| 5,357,513 | 10/1994 | Kay et al. | 370/95.3 |
| 5,432,778 | 7/1995 | Minde et al. | 370/95.3 |
| 5,432,800 | 7/1995 | Kuroda et al. | 371/37.7 |
| 5,491,719 | 2/1996 | Sellin et al. | 375/213 |
| 5,502,713 | 3/1996 | Lagerqvist et al. | 370/17 |
| 5,563,895 | 10/1996 | Malkamaki et al. | 371/32 |
| 5,574,983 | 11/1996 | Douzono et al. | 455/69 |
| 5,612,992 | 3/1997 | Dupuy et al. | 379/59 |

FOREIGN PATENT DOCUMENTS

| | | |
|---|---|---|
| 465 144 | 1/1992 | European Pat. Off. . |
| 535 812 | 4/1993 | European Pat. Off. . |
| 588 307 | 3/1994 | European Pat. Off. . |
| 593 404 | 4/1994 | European Pat. Off. . |
| 95/01072 | 1/1995 | WIPO . |
| 95/19080 | 7/1995 | WIPO . |

OTHER PUBLICATIONS

Inspec Abstract No. B9407–6250F–014 "New Base For GSM".
Inspec Abstract No. B9303–6120B–004 "A Survey of Array Error Control Codes".
Inspec Abstract No. : B91051248 "Introduction to Coding Theory V.".
Inspec Abstract No.: B9307–6120B–053, C9307–6130S–065 "Convergence of a Bayesian Iterative Error–Correction Procedure on a Noisy Shift".

*Primary Examiner*—Robert W. Beausoliel, Jr.
*Assistant Examiner*—Nadeem Iqbal
*Attorney, Agent, or Firm*—Pillsbury Madison & Sutro LLP

[57] ABSTRACT

A method for decoding information in a telecommunication network, in which the information frames are received, the data is buffered, decoded and a parity check is made. Before transmitting the data further in the transmission network an additional check is made. Depending on the outcome of the parity check and the additional check the frames to be transmitted further in the network are marked as faultless or defective. The result of the additional check is established from the processing of earlier received data.

4 Claims, 2 Drawing Sheets

DECODING METHOD

This application claims benefit of international application PCT/FI95/00164, filed Mar. 27, 1995.

BACKGROUND OF THE INVENTION

This invention relates to a decoding method of a telecommunication network, in which method: information frames are received and data contained in them is buffered until the amount of the buffered data corresponds to a predetermined amount, the buffered data is decoded, a parity check is made for the buffered data, and the buffered data is transmitted further in the telecommunication network.

This invention is specifically connected to the GSM mobile telephone system (Groupe Spécial Mobile), and more precisely to a method by which the quality of the connection between the mobile, that is, the subscriber unit, and the mobile services switching center can be improved.

In situations in which there is an active traffic channel in a base station but the mobile does not transmit radio signals to the base station on the connection continuously, the base station has no way of detecting from a received signal whether the subscriber unit has transmitted the frame or not. Therefore, the base station constantly receives noise from the radio path, detects and decodes it, and sends speech blocks further in TRAU-frames to a transcoder.

The above-mentioned situation occurs in the GSM system at least in connection with a handover when the handover is made between two base stations, or when a subscriber unit uses discontinuous transmission, that is, is in a DTX state. In the DTX state the-subscriber unit sends one speech frame of 20 ms in length in accordance with the GSM specifications, after which it has a pause of 460 ms in length before transmitting the next speech frame.

According to the GSM specifications, the base station has to be able to detect 99,8% of all defective speech blocks sent via the base station. This detection is based on a parity check made in connection with the decoding of speech blocks. Because in the above mentioned special situations all the speech blocks received from the radio path by the base station are defective, a defective speech block passes through the base station in compliance with the GSM specifications every tenth second on the average without the decoding of the base station detecting the error.

SUMMARY OF THE INVENTION

The object of this invention is to eliminate the above-mentioned drawback and to improve the quality of the connection between the subscriber unit and the mobile services switching center. This object is achieved with the method of the invention that is characterized in that the accuracy of the buffered data is resolved by a parity check and an additional check, the additional check taking into account results obtained in connection with the processing of data received earlier in time.

The invention is based on the idea that the number of forwarded defective speech blocks marked as faultless will decrease significantly when an additional check based on information obtained in the processing of previous speech blocks is made in addition to a parity check to ascertain the accuracy of the buffered speech block. Thus, the most important advantage of the method of the invention is that the connection between the subscriber unit and the mobile services switching. center can be significantly improved by very simple procedures. For example, in channel decoding of a GSM base station the utilization of the invention can be carried out as a whole by means of a software change, whereby the hardware costs of the base station will not rise.

A first preferred embodiment of the method of the invention is characterized in that in the additional check the number of successive parity checks showing error is checked, and if the number exceeds a predetermined limit value, the buffered data is found to be defective. In this embodiment of the invention, the first faultless speech block following a long string of defective speech blocks is rejected. As regards a base station according to the GSM specifications, the probability of a defective speech block being interpreted as faultless diminishes to less than 0,0004%. This means that a defective speech block passes through the base station once in 5000 seconds.

A second preferred embodiment of the method of the invention is characterized in that the additional check is based on measurements made in connection with the reception of the information frames, whereby the measurement results of the information frames that have transmitted the buffered data are compared to measurement results of such earlier information frames that are known to have been faultless, and that the buffered data is found to be defective if in the comparison the difference of the measurement results is found to exceed a predetermined limit value. In this embodiment of the invention other available information in addition to the parity check is utilized in identifying defective blocks. For example, the specifications of the GSM system determine that a base station should control the quality of signals received during normal traffic operation, e.g. by calculating the Bit Error Rate BER on the basis of a signal received from the output of a receiver of the base station. In addition to this, the GSM base station carries out, for example, RSSI (Received Signal Strength Indication) measurements, in which the power level of the received signal is measured, and measurements of the noise ratio of the received signal, i.e. SNR (Signal Noise Ratio) measurements. In this embodiment of the invention existing measurement results, or preferably their average, are utilized so that when the measurement results obtained in connection with the reception of a speech block in the buffer are compared to the corresponding results from faultless speech blocks received earlier, the accuracy of the speech block in the buffer can be checked.

BRIEF DESCRIPTION OF THE DRAWINGS

In the following, the invention will be described in more detail by means of a few preferred embodiments, with reference to the accompanying figures, in which.

DETAILED DESCRIPTION

Figure 1:
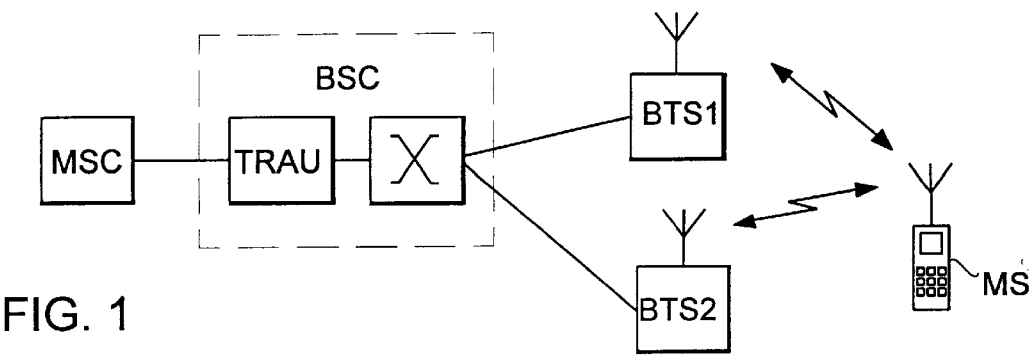
FIG. 1 shows basic elements of the GSM system.

FIG. 1 shows basic elements of the GSM system. A mobile services switching center MSC takes care of the switching of the incoming and outgoing calls in a corresponding manner as a fixed telephone network exchange. In addition to this, it performs operations characteristic of mobile telecommunication, such as location management of subscribers. Mobile subscriber units MS are connected to the center MSC by means of base station systems. The base station system comprises a base station controller BSC and base stations BTS1 and BTS2. The base station controller BSC is used to control several base stations BTS.

The GSM system is digital as a whole and speech transmission also takes place completely digitally. The speech coding and rate adapting functions of the network between the base stations BTS and the mobile services switching center MSC have been centered on one transcoder unit TRAU (Transcoder/Rate Adaptor Unit). In the GSM system, the TRAU can be located in several alternative places according to the choices made by the manufacturer. When the transcoder is located separate from the base station BTS (as in FIG. 1), data is transmitted between the base station and the transcoder in so called TRAU frames of 320 bits in size, which means that the transmission of one frame takes 20 ms at a transmission speed of 16 kbit/s.

The GSM system is described in more detail for example in *The GSM System for Mobile Communications*, by M. Moyle and M-B. Pautet, Palaiseau, France, 1992, ISBN:2-9507190-0-7, for which reason its structure and operation will not be described in greater detail in this context.

Figure 2:
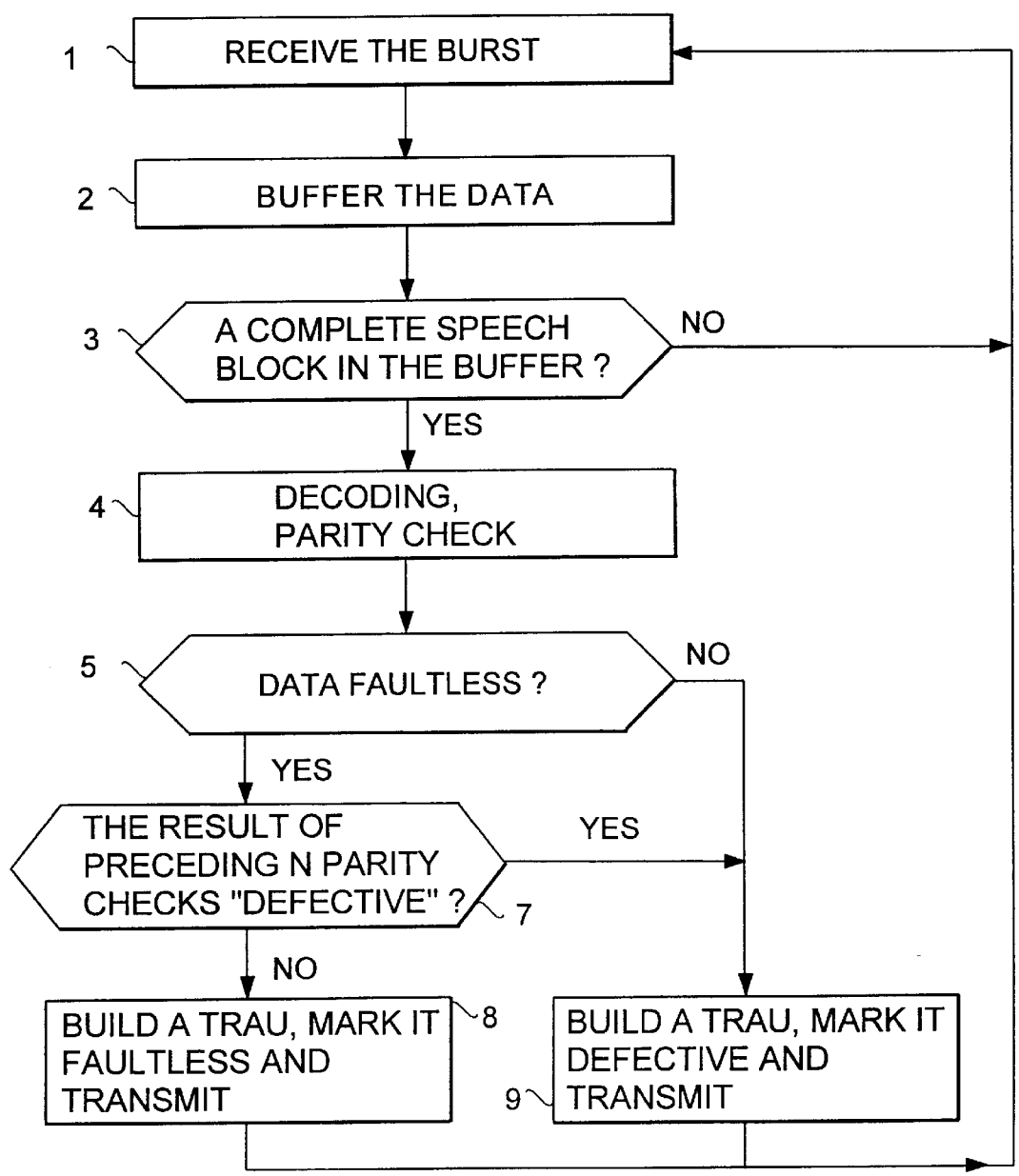
FIG. 2 shows a flow diagram that illustrates a first preferred embodiment of the method of the invention.

FIG. 2 shows a flow diagram that illustrates a first preferred embodiment of the method of the invention. The method shown in- the figure can be preferably applied in connection with channel decoding of a GSM base station, for instance. A radio frequency burst is received in block 1. The data contained in the received burst is fed to a buffer in blocks 2 and 3 in a manner known per se, after which the contents of the buffer are checked. When the amount of data fed to the buffer corresponds to one TRAU block of 320 bits in size (corresponds to data contained in 8 bursts), a transition is made to block 4 in which the speech block is decoded and after the decoding a parity check is made to check the accuracy of the speech block. There are 3 check bits in one speech block for the parity check.

One bit is reserved in the TRAU frame for indicating the accuracy of the frame. If it is found in block 5 that the speech block in the buffer is defective on the basis of the parity check, the above-mentioned check bit is given the value 1, after which a transition is made to block 9 where a TRAU frame is assembled and transmitted further.

If it is found in the parity check of block 4 that the data in the buffer is faultless, an additional check is made in block 7. The additional check in question is based on previous speech blocks. In FIG. 2, the speech block in the buffer is found defective if the preceding N speech blocks have been found defective, N being preferably between 5-100. If the speech block in the buffer is found to be faultless also in the additional check of block 7, the check bit is given the value 0 in block 8, after which a TRAU frame is assembled and transmitted further in the telecommunication network. On the other hand, if the buffered speech block is defective on the basis of the additional check made in block 7, a transition is made to block 9.

When the TRAU frame has been assembled and transmitted further in the telecommunication network, the buffer is emptied, after which the assembling of the next speech block will start from block 1.

In other words, in FIG. 2 the first faultless speech block following a long string of defective speech blocks is rejected. This means that the first sequence of 20 ms in length is lost, whereby the quality of the call is correspondingly impaired (the transcoder TRAU in FIG. 1 ignores, that is, does not forward those TRAU frames which were given 1 as the value of their check bit). If the impairing is thought to be unreasonable, the case shown in FIG. 2 can proceed so that the first speech block is copied from the buffer to a special memory before it is transmitted further. If the next buffered speech block is found to be faultless in the parity check, the speech block in memory is marked faultless, after which it is again transmitted further and a new speech block in the buffer is transferred to memory. Thus, the speech blocks are sent at a delay of 20 ms. The delay is caught up with after some time, for example when the parity check indicates that the speech block in the buffer is defective. Alternatively, the delay can be caught up with by skipping one speech block.

Figure 3:
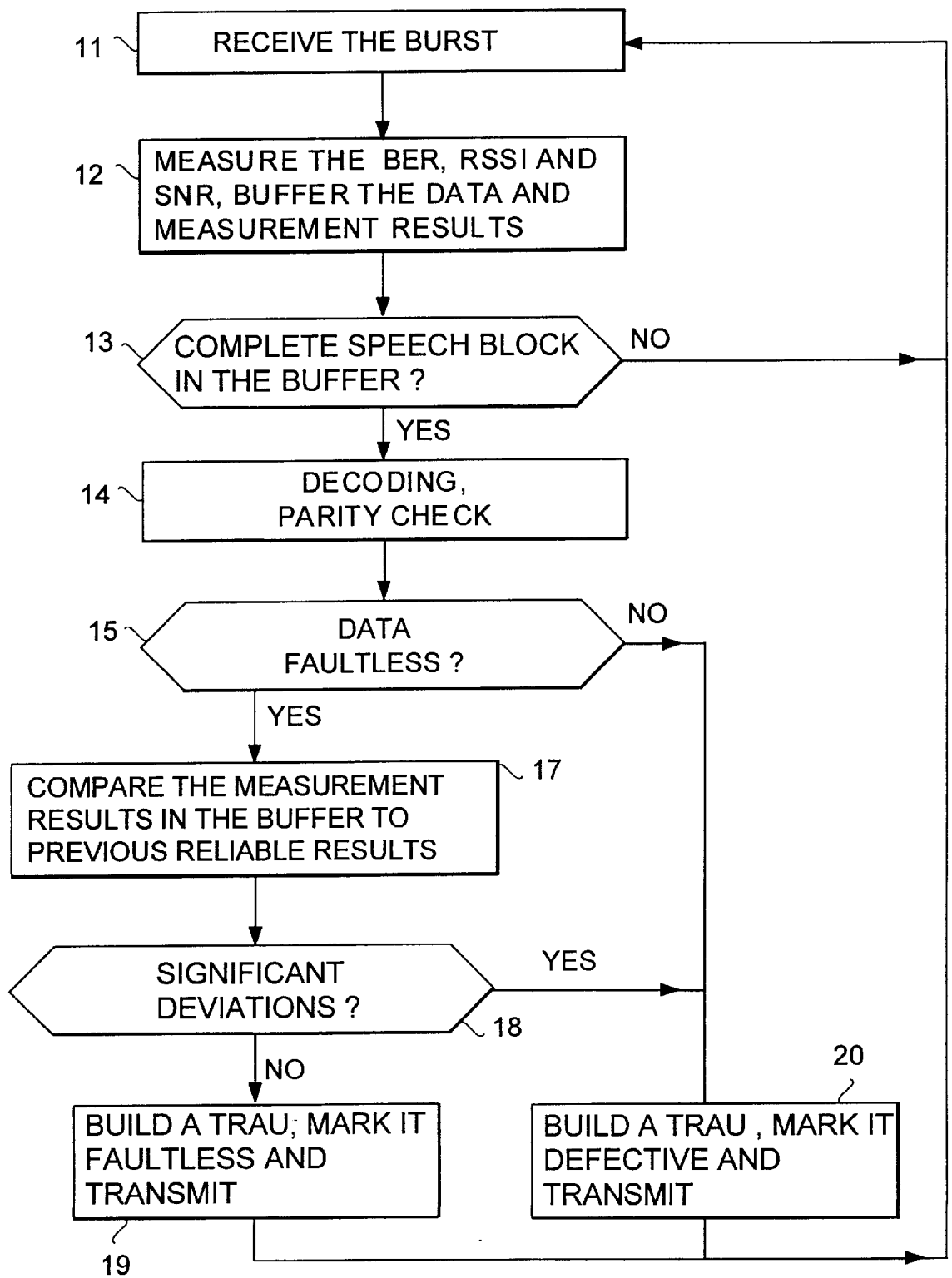
FIG. 3 shows a flow diagram that illustrates a second preferred embodiment of the method of the invention.

FIG. 3 shows a flow diagram that illustrates a second embodiment of the method of the invention. The method shown in the figure can be preferably applied in connection with channel decoding of the GSM base station, for instance. The method makes use of SACCH multiframes (Slow Associated Control Channel) that have a duration of 104 frames, that is, about 480 ms on the traffic channel.

During one SACCH multiframe, a mobile MS on a traffic channel normally transmits 100 radio bursts, of which 96 contain speech and 4 signalling. During the remaining 4 frames (so called empty frames), the mobile MS does not transmit anything.

When the mobile MS uses discontinuous transmission (DTX), the mobile may leave some of the bursts untransmitted. Even then it transmits at least 12 bursts during a SACCH multiframe (1 signalling block divided into 4 bursts and 1 block containing noise information divided into 8 bursts). That is, during one SACCH multiframe the base station BTS receives 88 bursts (=22 speech blocks) that the mobile MS has possibly never transmitted at all.

The GSM base station calculates the signal noise ratio (SNR) and the power level RSSI for each received radio burst. For each received signalling and speech block it also calculates the bit error rate (BER).

According to the second embodiment of the invention the base station stores measurement results of such bursts (12 per SACCH multiframe) that the mobile will transmit in any case, even when it uses discontinuous transmission. Thus, the base station holds in memory the measurement data of last 12 reliable bursts, that is:

SNR_1 . . . SNR_12, RSSI_1 . . . RSSI_12, and BER_1 . . . BER_2.

A radio frequency burst is received in block 11 of FIG. 3. The data of the received burst is input to the buffer in blocks 12 and 13 in a manner known per se, after which the contents of the buffer are checked. In block 12, the power level RSSI and the noise ratio SNR of the signal are measured for each burst in a manner known as such. In block 12, the bit error ratio BER is also measured for each received signalling or speech block. The above-mentioned measurement results are also buffered. When the amount of data input to the buffer corresponds to one TRAU frame that is 320 bits in size (corresponds to data contained in 8 bursts), a transition is made to block 14 in which the speech block is decoded and a parity check is made to check its, accuracy. There are 3 check bits in one speech block for the parity check.

One bit is reserved in the TRAU frame for indicating the accuracy of the frame. If it is found in block 15 that the speech block in the buffer is defective on the basis of the parity check, a transition is made to block 20, in which the check bit is given the value 1, after which a TRAU frame is assembled and transmitted further.

On the other hand, if it is found in the parity check that the speech block in the buffer is faultless, an additional check is made in block 17 after this. The additional check in question is based on the measurements made in block 12.

Because the TRAU frame in the buffer is assembled from eight bursts, to each of which are made the measurements mentioned above, the average of the buffered measurement results is calculated first. A buffered speech block may then have three reference values, that is, the average BER, RSSI and SNR values. These reference values are next compared to the average of the measurement results of the reliable bursts in the memory of the base station. If there are several measurement results in use, as in the example of FIG. 3, the bit error rate BER is preferably given most emphasis. If the difference between the reference values and measurement results exceeds a predetermined limit value, it is found in block 18 that the buffered speech block is defective, whereby a transition is made to block 20 in which the check bit is given the value 1, a TRAU frame is assembled and transmitted.

On the other hand, if it is found in block 18 that the buffered block is faultless, a transition is made to block 19 in which the check bit is- given the value 0, a TRAU frame is assembled and transmitted. further. After transmitting the TRAU frame the buffer is emptied, after which a transition is made to block 11, where the assembling of the next speech block is started.

It is to be understood that the above description and the figures related thereto are only meant to illustrate the present invention. Thus, the method of the invention can also be applied in other connections than in connection with the GSM system, although the invention is explained above by way of example specifically by means of the GSM system. Therefore, the embodiments of the method of the invention can vary within the scope of the attached claims.

I claim:

1. A decoding method of a telecommunication network comprising the steps of:
   receiving information frames and buffering data contained in them until the amount of the buffered data corresponds to a predetermined amount;
   decoding the buffered data;
   performing a parity check for the buffered data;
   transmitting the buffered data further in the telecommunication network; and
   resolving the accuracy of the buffered data by performing said parity check and by performing an additional check, the additional check taking into account results obtained in connection with the processing of data received earlier in time;
   said performing said additional parity check including checking the number of successive parity checks showing error, and if said number exceeds a predetermined limit value, said method further comprising finding the buffered data to be defective;
   said predetermined limit value being between 5 and 100;
   marking the data found to be defective in said additional check as being defective and copying the data marked as being defective into a memory device before performing said transmitting;
   performing a next parity check in regard to new buffered data, if the next parity check indicates that the new buffered data is faultless, considering the data stored in the memory device to be faultless, marking the data stored in the memory device as being faultless, and transmitting the data stored in the memory device further in the telecommunication network.

2. A decoding method of a telecommunication network comprising the steps of:
   receiving information frames and buffering data contained in them until the amount of the buffered data corresponds to an amount needed for a first datablock;
   decoding the first datablock;
   resolving the accuracy of the first datablock by performing a parity check;
   transmitting the first datablock further in the telecommunication network;
   receiving information frames and buffering data contained in them until the amount of the buffered data corresponds to an amount needed for a second datablock;
   decoding the second datablock;
   resolving the accuracy of the second datablock by performing a parity check and an additional check, the additional check taking into account the result of the parity check performed for the first datablock; and
   transmitting the second datablock further in the telecommunication network.

3. A decoding method of a telecommunication network comprising the steps of:
   receiving information frames, buffering data contained in them until the amount of the buffered data corresponds to an amount needed for a first datablock and storing first measurement results obtained in connection with said receiving of information frames;
   decoding the first datablock;
   resolving the accuracy of the first datablock by performing a parity check;
   transmitting the first datablock further in the telecommunication network;
   receiving information frames, buffering data contained in them until the amount of the buffered data corresponds to an amount needed for a second datablock and storing second measurement results obtained in connection with said receiving of information frames;
   decoding the second datablock;
   resolving the accuracy of the second datablock by performing a parity check and an additional check, said additional check comprising a comparison of the first and second measurement results; and
   transmitting the second datablock further in the telecommunication network.

4. A decoding method of a telecommunication network comprising the steps of:
   receiving information frames and buffering data contained in them until the amount of the buffered data corresponds to a predetermined amount;
   decoding the buffered data;
   performing a parity check for the buffered data;
   transmitting the buffered data further in the telecommunication network; and
   resolving the accuracy of the buffered data by performing said parity check and by performing an additional check, the additional check taking into account results obtained in connection with the processing of data received earlier in time;
   marking the data found to be defective in said additional check as being defective and copying the data marked as being defective into a memory device before performing said transmitting;
   performing a next parity check in regard to new buffered data, if the next parity check indicates that the new buffered data is faultless, considering the data stored in the memory device to be faultless, marking the data stored in the memory device as being faultless, and transmitting the data stored in the memory device further in the telecommunication network.

* * * * *